Dec. 12, 1967  G. B. JACOBY  3,357,182

SCREW TYPE MASTER CYLINDER ASSEMBLY

Filed Oct. 23, 1965

INVENTOR.
Gerald B. Jacoby
BY
Donald P. Selwecki
HIS ATTORNEY

United States Patent Office 3,357,182
Patented Dec. 12, 1967

3,357,182
SCREW TYPE MASTER CYLINDER ASSEMBLY
Gerald B. Jacoby, Dayton, Ohio, assignor to General Motors Corporation, Detroit, Mich., a corporation of Delaware
Filed Oct. 23, 1965, Ser. No. 503,743
3 Claims. (Cl. 60—54.6)

ABSTRACT OF THE DISCLOSURE

This invention teaches the use of a piston in a master cylinder having a high lead screw threaded exterior portion adapting the piston to be actuated by a brake pedal pivoting on a longitudinal axis of the piston.

This invention relates to force developing mechanisms and more particularly to an hydraulic master cylinder having a spirally moving piston therein.

Hydraulic master cylinders of common design usually include a translationally movable piston carried in a fluid pressure developing chamber, said piston being slidable axially in response to an input force to develop hydraulic pressure. One of the basic disadvantages of this type of arrangement is that the piston in the master cylinder must necessarily move a relatively greater distance in order to displace fluid in the fluid pressure developing chamber, thereby necessitating a long chamber.

It is an object of the present invention to provide an hydraulic master cylinder which requires very little piston movement to produce hydraulic pressure.

It is another object of the present invention to provide an improved hydraulic master cylinder which is actuated by a pedal pendantly supported from a power piston which is pivotable about the longitudinal axis of the piston.

It is still another object of the present invention to provide an improved hydraulic master cylinder which has a minimum number of parts and is, therefore, simple and economical to manufacture.

Further objects and advantages of the present invention will be apparent from the following description, reference being had to the accompanying drawings wherein a preferred embodiment of the present invention is clearly shown.

Figure 1:
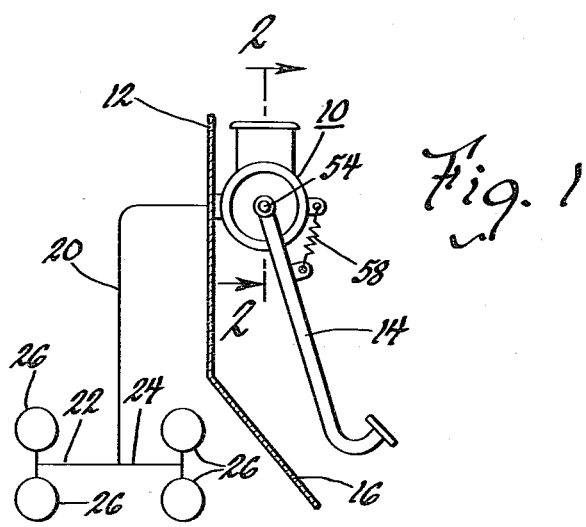
FIGURE 1 illustrates the invention in its operative environment as an hydraulic master cylinder for a braking system.

Referring to FIGURE 1, an hydraulic master cylinder housing 10 is carried within the driving compartment of a vehicle on a fire wall 12 and includes a pedal 14 pendantly supported from housing 10 near toeboard 16. Housing 10 includes an outlet 18 communicating hydraulic pressure to lines 20, 22 and 24 to vehicle brakes 26.

Figure 2:
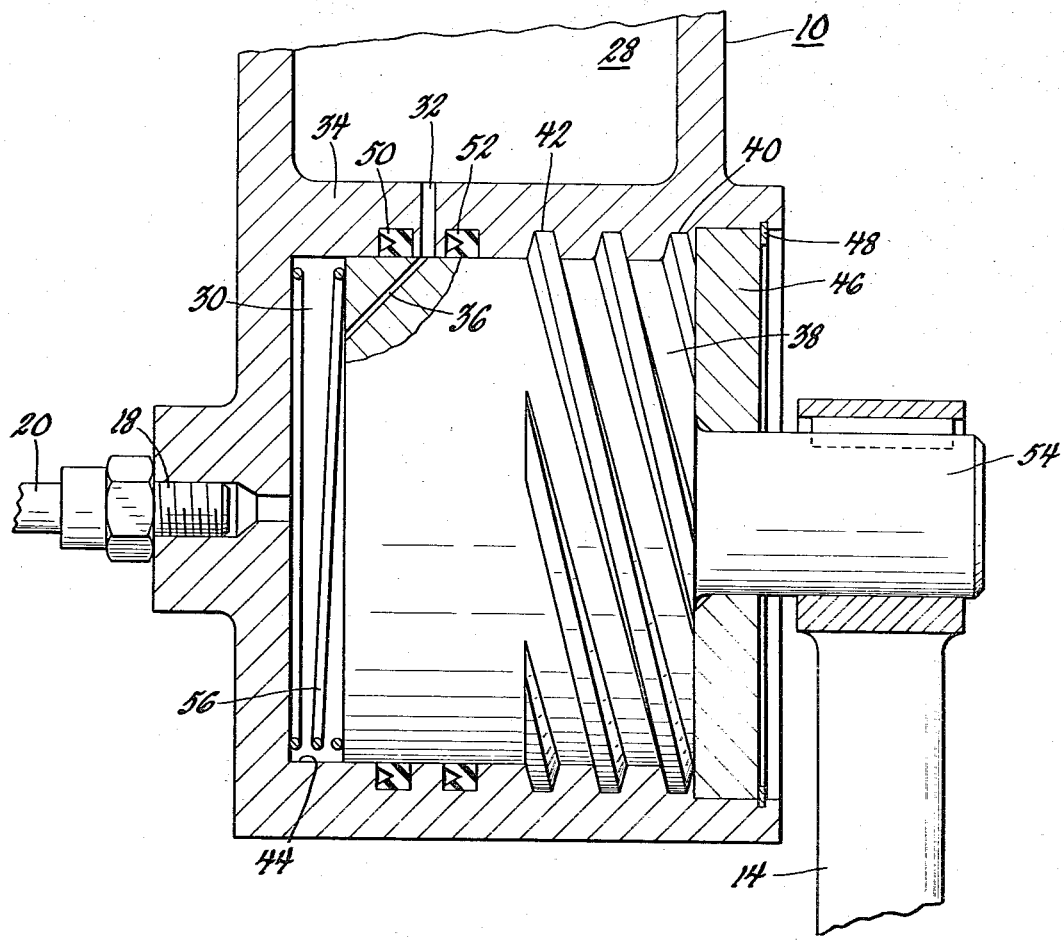
FIGURE 2 is a sectional view of the subject invention taken along line 2—2 of FIGURE 1.

Referring to FIGURE 2, housing 10 includes a fluid storage chamber 28 and a force developing chamber 30 formed therein. Chamber 28 communicates with chamber 30 through a passage 32 formed in wall 34 separating chamber 28 from chamber 30. Compensating passage 36 is formed in rotatable piston 38 and serves to communicate fluid from passage 32 to chamber 30 when piston 38 is positioned as viewed in FIGURE 2 which is the poised position.

Piston 38 has a peripherally formed multistart high lead screw portion 40 cooperating with threaded portions 42 formed in bore 44 in chamber 30. Closure member 46 retained by split ring 48 maintains piston 38 in its operative position and isolates chamber 30 from the exterior of housing 10. Seals 50 and 52 carried in the wall or bore 44 prevent the casual passage of fluid to the exterior housing 10 and between passage 32 and chamber 30. Member 54 is integrally formed with piston 38 and pilots piston 38 in member 46. Pedal 14 is carried by member 54 non-rotatable with respect thereto. It is therefore clear that a pivotal movement of pedal 14 on the longitudinal axis of piston 38 results in a corresponding rotation of piston 38 in bore 44.

In operation, when a vehicle operator desires to apply vehicle brakes, pedal 14 is pivoted toward toeboard 16 of unit FIGURE 1. According to FIGURE 2, piston 38 is rotated and moved toward outlet 18 due to the cooperation of screw portion 40 and threaded portion 42. Compensating passage 36 moves out of fluid communication relationship to passage 32 resulting in the fluid trapped in chamber 30 being forced into outlet 18. The cross sectional area of piston 38 acting in chamber 30 results in a great amount of fluid displacement toward outlet 18 resulting in a very rapid pressure build-up in line 20.

When force is removed from pedal 14, spring 56, acting in chamber 30 against piston 38, moves piston 38 to the right as viewed in FIGURE 2 and replaces pedal 14 to the poised position seen in FIGURE 1.

Another method of pedal and piston return is shown by the dotted lines in FIGURE 1 in the structure of spring 58 attached to the outer periphery of housing 10 and pedal 14. It is understood that either of the two return mechanisms are included in the concept disclosed herein and it is equally clear that pedal 14 could be pendantly supported from housing 10 in such a fashion that the weight of pedal 14 would be sufficient when combined with the residual pressure in chamber 30 to return pedal 14 to the poised position. The positioning of housing 10 in its operative environment would determine which method of pedal return would be used in a given installation.

The utility of the subject invention is particularly apparent in the operative environment of a vehicle braking system due to the relatively slim overall design of the housing made possible by the movement of the brake pedal around the longitudinal axis of the power piston. This design master cylinder effectively eliminates the elongated housing normally provided for master cylinders and allows a much more compact arrangement of parts in a vehicle body. In addition, piston 38 is the only moving part within housing 10 and compensation for the master cylinder is provided by the simple movement of a passage formed in the power piston out of fluid communicating relationship with a passage of a housing. In this manner, the destruction of seals normally formed on power pistons is prevented when the seal is thrust past the relatively sharp edges of a compensating passage formed between the power chamber and the fluid reservoir.

While the embodiment of the present invention, as herein disclosed, constitutes a preferred form, it is to be understood that other forms might be adopted.

What is claimed is as follows:

1. An hydraulic master cylinder comprising: a housing including a force developing chamber and a fluid storage chamber selectively communicating therewith; rotatable piston means translationally movable in said force developing chamber and including helical type screw portions formed on the periphery thereof; said force developing chamber defining a bore having complementary helical type screw portions in the wall thereof cooperatively engaging said piston screw portions; and actuator means pivotally carried by said rotatable piston means for exerting a torque force on said rotatable piston means for spiralling said piston means linearly forward in said force developing chamber to develop a fluid pressure in said force developing chamber, said fluid storage chamber including means for compensating for a fluid lack in said force producing chamber by gravity flow thereinto when said piston means is in a poised position.

2. An hydraulic master cylinder according to claim 1 wherein said rotatable piston means includes means angularly disposed therein for selectively establishing a path for fluid communication between said fluid storage chamber and said force developing chamber.

3. An hydraulic master cylinder according to claim 1 wherein said rotatable piston means includes a peripherally formed multi-start high lead screw portion cooperating with said complementary formed threaded portions of said housing to achieve a predetermined controlled advance rate for said rotatable piston means.

References Cited

UNITED STATES PATENTS

| | | | |
|---|---|---|---|
| 1,531,234 | 3/1925 | Davis | 92—116 X |
| 1,866,217 | 7/1932 | Mayer | 103—157 |
| 2,163,874 | 6/1939 | Goepfrich | 60—54.6 X |
| 2,242,542 | 5/1941 | Peterson et al. | 60—54.6 X |
| 2,254,937 | 9/1941 | Dick | 60—54.6 |
| 2,296,864 | 9/1942 | Morrison | 60—54.6 X |
| 2,374,672 | 5/1945 | Farris | 60—54.6 |

FOREIGN PATENTS 742,886   12/1943   Germany.

EDGAR W. GEOGHEGAN, *Primary Examiner.*

MARTIN P. SCHWADRON, *Examiner.*

I. C. COHEN, *Assistant Examiner.*